Patented Dec. 26, 1944

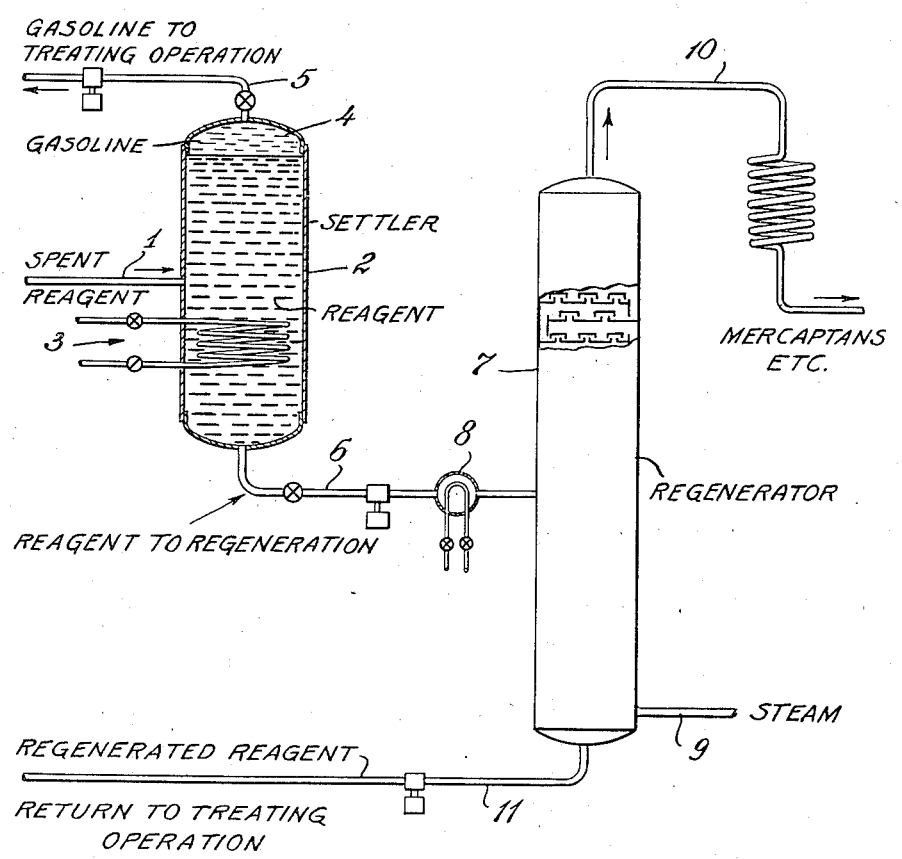

2,366,104

UNITED STATES PATENT OFFICE 2,366,104

REGENERATION OF GASOLINE TREATING REAGENTS

John Happel, Brooklyn, N. Y., assignor to Socony-Vacuum Oil Company, Incorporated, a corporation of New York Application August 8, 1942, Serial No. 454,097

3 Claims. (Cl. 252—192)

This invention has to do with the regeneration of spent caustic alkali treating reagents which have been used in the refining of gasolines and similar light oils. Such gasolines and similar light oils usually contain as their most important impurity weakly acidic substances predominantly mercaptans and similar compounds. Strong aqueous solutions of caustic alkali will remove some but not all of these acidic materials. More recently it has been found that if certain substances are added to these aqueous caustic alkali solutions, that the capability of the reagent for removing the acidic substances present in light petroleum fractions is considerably increased. These capability increasing additives are designated in the petroleum industry as solutizers.

A particular example of such a solutizer material is isobutyric acid. Many other solutizer materials are known, of varying effectiveness. It is customary when using such a caustic-solutizer reagent, after the reagent has become spent in removing impurities, to reagenerate the reagent. This regeneration of the reagent is basically nothing more than a steam distillation, or a distillation with other appropriate carrier material whereby the mercaptan or other acidic materials are removed from the reagent, taking advantage of the fact that mercaptans may be freed in this manner from a caustic-solutizer reagent in the same manner that mercaptans might be freed from an ordinary caustic reagent. There is, however, one peculiarity which must be taken into account in the regeneration of caustic-solutizer solutions. This arises from the fact that the caustic-solutizer solutions have a marked capability for dissolving light hydrocarbons, giving rise under most circumstances to the presence of materials of gasoline boiling range in the spent caustic-solutizer solution. While the amount of oil so dissolved may be relatively small, expressed in terms of a single reaction, it becomes economically great when a reagent continuously cycling between use and regeneration is applied to the treatment of large volumes of gasoline. This material of gasoline nature is usually handled in either one or two ways. If the spent reagent is taken directly from the treating use to regeneration, the dissolved gasoline will be evaporated during the regeneration and condensed and recovered with the removed mercaptans. This has several objections. First, the gasoline so removed is lost from the system and becomes an economic loss. Second, if, as is frequently the case, the mercaptans are passed on to an economic disposal, the gasoline therein becomes an impurity with respect to the mercaptans. It is possible in certain ways to separate the hydrocarbons from the mercaptans at this point but any such separation results only in a hydrocarbon so highly charged with mercaptans that it may not be returned to the ordinary treating operation in which it originated. The other method of handling, usual in the art, takes advantage of the fact that if the spent aqueous caustic-solutizer solution be diluted with water, it is possible to "break out" the dissolved gasoline and this gasoline so separated is sufficiently low in mercaptan content that it may be return to the treating process from which it came. This operation is under the very decided economic disadvantage that the resulting diluted aqueous solution must be reconcentrated during regeneration.

This invention has for its object the provision of a method of regeneration of such spent reagents whereby the dilution of the reagent is avoided and at the same time a gasoline fraction not substantially different in content of impurities from that which was originally treated may be recovered from the process.

This invention is based upon the discovery that when such a spent treating reagent containing dissolved gasoline is subjected to quiescent settling under elevated temperature and under sufficient pressure, to prevent evaporation of dissolved hydrocarbons that these dissolved hydrocarbons will separate from the reagent without the necessity of diluting the reagent and that the gasoline so separated is not particularly different in content of impurities from that originally treated in the process and may be returned thereto. In this manner the loss of salable hydrocarbons from the treating operation is minimized, the necessity for reconcentration of a diluted aqueous treating reagent is avoided, and the recovery of the mercaptans in a form relatively free from hydrocarbon impurities may be accomplished.

This process may be readily understood by reference to the drawing, which is attached to this specification, which shows in highly diagrammatic form a setup of apparatus suitable for the practice of the invention. In this drawing spent reagent containing dissolved gasoline, coming from the treating system is introduced through pipe 1 and passes into settler 2, which is heated as, for example, by steam coils 3. (This heating may be either internal or external.) In settler 2, the spent reagent is heated to a temperature usually substantially in excess of the boiling point of water, usually at least to 250° F. and preferably to about 260–280° F. The material in the separator is kept under sufficient pressure so that no evaporation of contained hydrocarbons occurs. Dissolved gasoline will break out in the settler and layer separation will be effected, the gasoline rising to the top of the separator, as shown at 4, from whence it may be drawn off through pipe 5. Since the gasoline so separated is not substantially different in its content of impurities from that gasoline which was originally charged to the treating operation from which spent reagent came, the separated gasoline may be returned by pipe 5 to the treating operation as shown. The spent reagent, substantially reduced in dissolved gasoline content, will be removed from the bottom of the settler 2 by pipe 6 and discharged to regenerator 7, usually being preheated as in preheater 8, before entry to the regenerator. The regenerator may be any of the usual stripping still types of operation and, as shown, consists of a fractionator to which heated spent solution is fed and to which steam is introduced as by pipe 9, and in which mercaptans, other impurities and remaining hydrocarbons dissolved in the spent reagent pass overhead through vapor pipe 10 to be condensed and removed from the process, regenerated reagent being removed from the bottom of regenerator 7 by pipe 11 and returned to the treating operation.

As an example of the operation of this process, there might be cited one operation wherein a certain caustic-solutizer solution which contained 280 grams per liter of potassium hydroxide, 254 grams per liter of potassium iso-butyrate and 161 grams per liter of potassium alkyl phenolates was contacted with gasoline in the ratio of 1 volume of reagent to 5 volumes of gasoline at a temperature of 85° F. After such contacting, the reagent was allowed to settle to accomplish ordinary gravity separation of entrained gasoline and was then subjected to a layer separation operation in a closed vessel at a temperature of 270° F. and under a pressure of 60# per square inch gauge which was sufficient to prevent the evaporation of any contained hydrocarbons after which the layer of separated gasoline was drawn off and returned to the treating process, and the reagent was forwarded to a steam stripping regeneration in which it was freed of dissolved impurities to enable its return to treating. Actual analysis of the dissolved gasoline content of the spent reagent before and after the heat and pressure gravity separation was as follows:

| Sample | Gasoline content, volume per cent |
| --- | --- |
| Charge to settler | 0.38 |
| Reagent withdrawn from settler | 0.26 |

The actual recovery of gasoline made was slightly in excess of 1% by volume of the reagent treated. In terms of percent this appears rather small. In terms of a commercial operation treating tens of thousands of barrels of gasoline per day, the recovery of gasoline by this means would attain considerable economic significance. This particular example recovered approximately one-third of the dissolved gasoline from this particular reagent. Other work with other solutizer type treating reagents gave considerably greater percentage recoveries upon the gasoline dissolved in the spent reagent. The gasoline which may be dissolved in a spent reagent is related to the concentration of the reagent and also to the particular alkaline reagent and solutizer additive reagents which may be present. The capability of recovery or removal of gasoline by the method here disclosed from such reagents also appears to be dependent upon the concentration of the reagent and of the specific chemicals present. Certain reagent combinations which have a relatively low gasoline dissolving capability frequently have a high gasoline retention capability. Other reagents which have high gasoline dissolving ability may be quite effectively treated, with high percentage recovery of gasoline by this method. In no case encountered has it been found that this method of operation will not substantially reduce the percentage of dissolved gasoline in the spent reagent without the necessity of diluting and later reconcentrating the spent reagent.

The temperature which is to be used will vary somewhat with the particular combination of reagents, additives, etc., being used. In all cases it will be well above the boiling point of water. In most cases, it will be at least 250° F. The preferred temperature which has been found applicable to most of the reagent combinations normally used appears to be between 260 and 280° F., usually about 270° F. The pressure which is to be used will be that pressure necessary to prevent evaporation of the hydrocarbons which may be present. In other words, it must be sufficient in amount to permit separation of the dissolved gasoline in the liquid phase, but need not be greater than this. Usually for temperatures of 270° F., it will be found that gauge pressures in the range of from 50# to 90# per square inch, usually about 60# per square inch will be sufficient.

I claim:

1. In a process for regenerating spent aqueous caustic alkali solutions containing solubility promoters for mercaptans, the steps which comprise subjecting the spent aqueous solution, in the absence of added water, to quiescent settling, at elevated temperature insufficient to decompose alkali mercaptides and under pressure sufficient to prevent evaporation of hydrocarbons dissolved therein, to permit layer separation of said hydrocarbons, withdrawing the hydrocarbons, and removing the mercaptans from the remaining aqueous solution to regenerate it.

2. A process for regenerating spent aqueous caustic alkali reagents containing solubility promoters for mercaptans which comprises confining the spent reagent, without intervening dilution, in a gravity separating zone, under a temperature of at least about 250° F., insufficient to decompose alkali mercaptides under pressure sufficient to prevent evaporation of hydrocarbons contained therein, and for a time sufficient to permit layer separation of hydrocarbons therefrom, separately withdrawing separated hydrocarbons and reagent from said zone, and removing the mercaptans from the reagent to regenerate it.

3. A process for regenerating spent aqueous caustic alkali reagents containing solubility promoters for mercaptans which comprises confining the spent reagent, without intervening dilution, in a gravity separating zone; under a temperature of at least about 270° F., insufficient to decompose alkali mercaptides under pressure sufficient to prevent evaporation of hydrocarbons contained therein, and for a time sufficient to permit layer separation of hydrocarbons therefrom, separately withdrawing separated hydrocarbons and reagent from said zone, and removing the mercaptans from the reagent to regenerate it.

JOHN HAPPEL.